(12) United States Patent
Korat et al.

(10) Patent No.: US 8,036,923 B2
(45) Date of Patent: *Oct. 11, 2011

(54) METHOD AND SYSTEM FOR EXECUTING WORK ORDERS

(75) Inventors: Eduard Korat, Campbell, CA (US); Thomas Heinzel, San Francisco, CA (US); Ramakoti Konatham, Sunnyvale, CA (US); Ganesh Vellore, San Francisco, CA (US); Cora Zimmermann, Belmont, CA (US)

(73) Assignee: SAP AG, Walldorf (DE)

( * ) Notice: Subject to any disclaimer, the term of this patent is extended or adjusted under 35 U.S.C. 154(b) by 761 days.

This patent is subject to a terminal disclaimer.

(21) Appl. No.: 11/947,802

(22) Filed: Nov. 30, 2007

(65) Prior Publication Data

US 2009/0144098 A1   Jun. 4, 2009

(51) Int. Cl.
*G06F 17/50* (2006.01)
*G06F 9/44* (2006.01)

(52) U.S. Cl. .......................................... 705/7.11; 705/28
(58) Field of Classification Search .................. None
See application file for complete search history.

(56) References Cited

U.S. PATENT DOCUMENTS

| | | | |
|---|---|---|---|
| 5,893,074 A * | 4/1999 | Hughes et al. | 705/8 |
| 7,249,044 B2 * | 7/2007 | Kumar et al. | 705/8 |
| 2005/0114829 A1 * | 5/2005 | Robin et al. | 717/101 |
| 2008/0313024 A1 * | 12/2008 | Kunichika et al. | 705/11 |
| 2009/0007525 A1 * | 1/2009 | Lewis et al. | 53/474 |

* cited by examiner

*Primary Examiner* — Luna Champagne

(57) ABSTRACT

What is described is a method and a system for executing work orders. A first request for receiving a progress information on a work order is generated. A degree of violation between the work order and the progress information is calculated by comparing the work order and the progress information. A tolerance violation status is determined based upon the degree of violation. A second request is generated for receiving a content for the work order to resolve the tolerance violation status. The work order is updated based the content.

19 Claims, 4 Drawing Sheets

METHOD AND SYSTEM FOR EXECUTING WORK ORDERS

FIELD OF THE INVENTION

Embodiments of the invention generally relate to the field of supply network collaboration and more specifically to a method and a system for executing work orders.

BACKGROUND OF THE INVENTION

A collaboration system provides collaboration of business objectives in a supply chain network. Collaboration systems enable users to collaborate in the creation of documents and other electronic records. Collaboration technologies deliver the functionality for many entities to enhance common deliverable information. Such collaboration systems include telephone, e-mail, synchronous conferencing, instant messaging, faxing, voice mails, video conferencing, and the like. Collaboration tools facilitate and manage group activities. Examples of collaborative tools include electronic calendars, work flow systems, knowledge management, project management, online documents and the like.

Existing collaboration systems enable exchange of information between two or more entities such as suppliers and customers and altering one or more components of business process. Examples of business processes include development of an idea, creation of a design, outsourced production or the like. Suppliers and customers may want to closely integrate and co-ordinate with each other for a product development and production. The collaboration system helps entities integrate their business process and create additional value through integration. There is a need for the entities to react in sufficient time on components in a business process that are missing or products whose yield is low. Therefore, a system is required for providing a difference between an actual product specification and a required production process specification In addition, the system must enable the entities to negotiate on the specification and reach an agreement based upon the negotiation.

SUMMARY OF THE INVENTION

Embodiments of the invention are generally directed to a method and a system for executing work orders. A first request for receiving a progress information on a work order is generated. Multiple progress information updates are typically collected during production. A degree of violation between the work order and the progress information is calculated by comparing the work order and the progress information. A tolerance violation status is determined based upon the degree of violation. A specific request action is generated for receiving an updated progress information for the work order to resolve the tolerance violation status. The work order is updated based the content.

These and other benefits and features of embodiments of the invention will be apparent upon consideration of the following description of embodiments thereof, presented in connection with the following drawings in which like reference numerals are used to identify like elements throughout.

BRIEF DESCRIPTION OF THE DRAWINGS

The claims set forth the embodiments of the invention with particularity. The embodiments of the invention, together with its advantages, may be best understood from the following detailed description taken in conjunction with the accompanying drawings. The invention is illustrated by way of example and not by way of limitation in the figures of the accompanying drawings. It should be noted that references to "an" or "one" embodiment in this disclosure are not necessarily to the same embodiment, and such references mean at least one.

DETAILED DESCRIPTION

Embodiments of the invention are generally directed to a method and system for executing work orders. A first request for receiving a progress information on a work order is generated. A degree of violation between the work order and the progress information is calculated by comparing the work order and the progress information. A tolerance violation status is determined based upon the degree of violation. A second request is generated for receiving a content for the work order to resolve the tolerance violation status. The work order is updated based the content.

Figure 1:
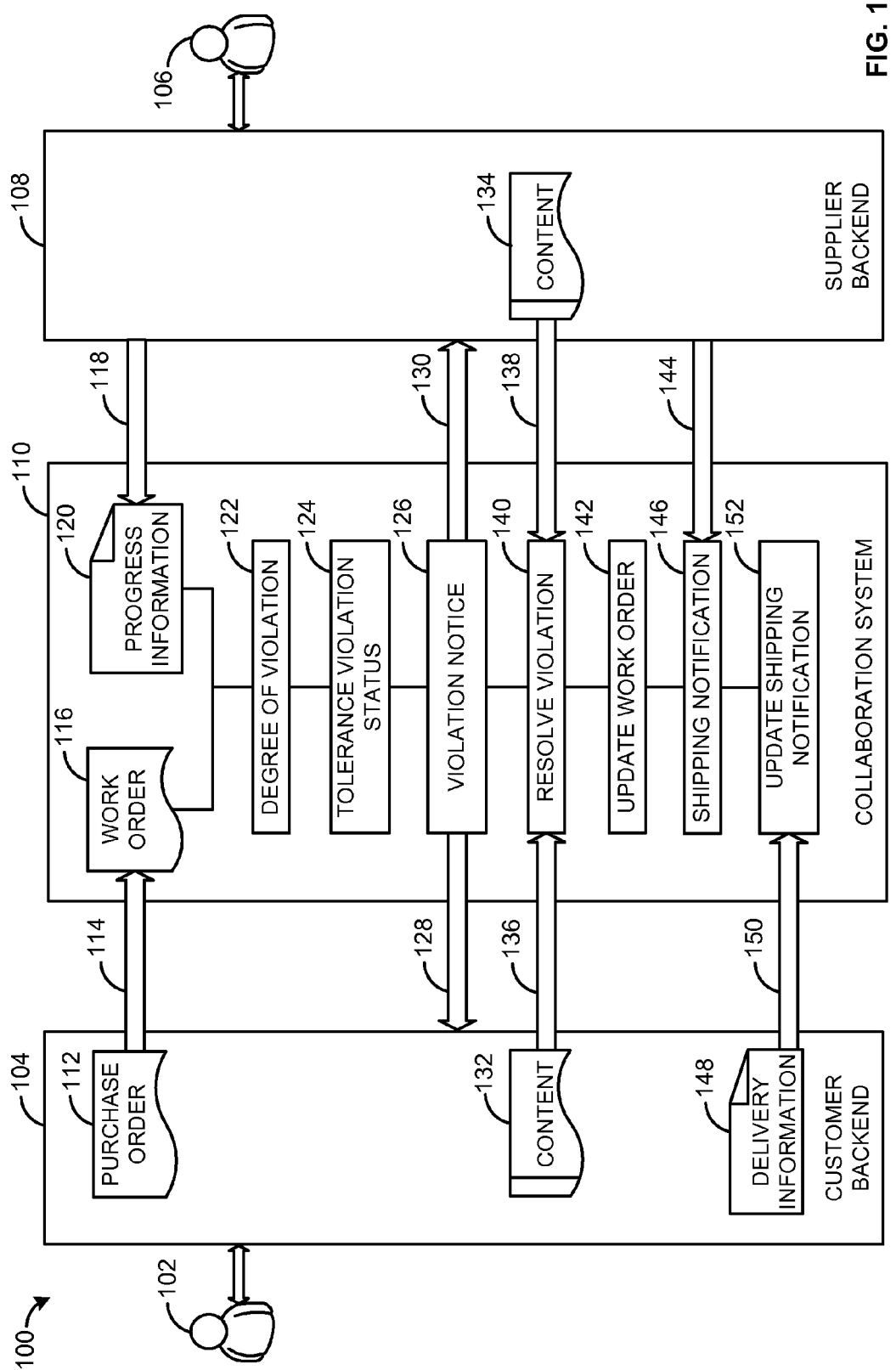
FIG. 1 is a functional block diagram of a system for executing a work order according to an embodiment of the invention.

FIG. 1 is a functional block diagram of system 100 for executing a work order according to one embodiment of the invention. Customer backend 104 is typically maintained by customer 102 and supplier backend 108 is typically maintained by supplier 106. Collaboration system 110 generally helps collaboration between customer backend 104 and supplier backend 108. In an embodiment, purchase order 112 is typically generated by customer 102 in customer backend 104 for a supply of goods or products from supplier 106. Based on purchase order 112, work order 116 is generated in collaboration system 110. In an embodiment, multiple work orders may be generated for every purchase order 112 in collaboration system 110. In an embodiment, work order 116 is generated for each item of purchase order 112 or each schedule line of purchase order 112. Work order 116 is typically a collaboration object, generally a document including supply chain related information provided by customer 102 and supplier 106. From a business perspective, work order 116 covers the functional needs of outsourced manufacturing requirements. In an embodiment, supplier 106 carries out a production of goods as prescribed by customer 102 before delivering the goods to customer 102. Typically, work order 116 includes the following information:

Production and delivery request from customer 102 to supplier 106;

Production and delivery confirmation from supplier 106 to customer 102;

Production and delivery agreement which is an agreed plan between customer 102 and supplier 106;

Production information including production steps which are also known as phases, attachments and parameters;

Production progress actual data;

Production outputs: yield, scrap, on-hold, reworked;

Batch/Lot number assignment (planned and actual);

Customer-specific and supplier-specific notes for textual communication; and

Process status information on requests, confirmations, phases and item.

The supply chain related information may include a work order item, a work order delivery, a production phase, a phase input and a phase output. The work order item may typically contain a partner identification information of customer 102 and supplier 106, a goods recipient, and a location information. The partner may include customer 102, supplier 106 and the goods recipient. The work order item also serves as an aggregation point for information of a work order delivery. The work order delivery may include information about ordered products, product quantities, delivery and shipping time. The work order delivery may be received as a request, a confirmation, an actual order and a projected order, or the like.

The production phase includes information about the required production steps, including a description and a duration of the production steps to be carried out by supplier 106. Typically, the phase input includes information of a component material, a quantity to be used in each phase, and a point in time the production phase has to begin. The phase output includes information of a resulting product, a quantity resulting from a phase execution and a point in time when the product is received by customer 102. The phase input and the phase output typically indicate a flow of materials through each phase in the production process. Work order 116 may also include a machine setting information, a product design details and a production process details. The delivery information in work order 116 is typically represented by a transport phase, where an input of the transport phase includes an information about shipping of a product and an output of the transport phase includes an information about delivery of the product. Typically, the phase input and the phase output may include a request phase input and a request phase output generally created by customer 102, a confirmation phase input and a confirmation phase output generally created by supplier 106, an actual phase input and an actual phase output generally reported by supplier 102 during executing the production of work order 116 by supplier 106, and a projected phase input and a projected phase output generally calculated by collaboration system 110 based on the actual and the planned phase input and the planned phase output. The data in an agreed plan includes a combination of the inputs and outputs of the request phase and the confirmation phase.

Work order 116 typically allows grouping of the inputs and outputs of the request phase and the confirmation phase. A group of the inputs and the outputs resulting from the grouping is typically a production run. The production run generally allows representing a phased production where partial product quantities are produced at different times. For example, a work order item in work order 116 may produce a total quantity of ten products where the production of six products is started first and the production of the remaining four products is started at a later point in time.

Typically, progress information 120 includes an actual input data, an actual output data, an actual consumption of components and an available date of delivery of products by supplier 106. Thus, progress information 120 is an actual data of work order 116 represented by an actual phase input and an actual phase output, typically indicating a flow of materials through out a production process. Based on progress information 120, collaboration system 110 typically calculates the delivery quantities and the delivery date. Customer 102 at any instance may update work order 116. Customer 102 may update work order 116 manually through a web user interface or through customer backend 104. In an embodiment, on each updation of work order 116 by customer 102, a negotiation of work order 116 takes place between supplier 106 and customer 102. The result of the negotiation is typically the agreed plan.

Customer 102 proposes purchase order 112. Purchase order 112 is typically created in customer backend 104. Purchase order 112 is transmitted 114 to collaboration system 110. Based on purchase order 112, work order 116 is generated in collaboration system 110. In an embodiment, work order 116 may be created based on a sub-contract order typically proposed by customer 102. Collaboration system 110 may create a corresponding work order for the sub-contract order. In an embodiment, work order 116 is a result of negotiation between customer 102 and supplier 106. A negotiation of work order 116 may include receiving suggestions from customer 102 and supplier 106. Typically, the suggestions from customer 102 and supplier 106 include one or more changes in work order 116 and one or more changes in progress information 120.

At the end of the negotiation, customer 102 and supplier 106 reach an agreement and an agreed work order or the agreed plan is generated. Progress information 120 is typically provided 118 by supplier backend 108 to collaboration system 110. In an embodiment, a request is generated by collaboration system 110 for supplier backend 108 to provide 118 progress information 120 for work order 116. In an embodiment, collaboration system 110 publishes work order 116, which is visible to supplier 106. Supplier 106 may provide progress information 120 on viewing work order 116 through a web user interface or automatically through supplier backend 108.

Progress information 120 and work order 116 are compared and degree of violation 122 is calculated. Degree of violation 122 is calculated to determine a deviation of progress information 120 from work order 116. Collaboration system 110 determines tolerance violation status 124 based upon degree of violation 122. In an embodiment, a tolerance level for work order 116 is defined in collaboration system 110. The tolerance level is usually a maximum allowed degree of violation 122. Typically, a tolerance violation occurs if progress information 120 does not conform to the tolerance level of work order 116. Tolerance violation status 124 is typically determined only if degree of violation 122 is above the tolerance level. Based upon a nature of violation and degree of violation 122, tolerance violation status 124 may take one of the values including an actual quantity too high, an actual quantity too low, an actual completion too late, a projected quantity too high, a projected quantity too low, a projected completion too late and a projected completion too early.

Violation notice 126 is sent 128 to customer backend 104 by collaboration system 110. Similarly, violation notice 126 is sent 130 to supplier backend 108 by collaboration system 110. In an embodiment, violation notice 126 is published in collaboration system 110, and an alert message is generated to notify tolerance violation status 124. Violation notice 126 typically communicates degree of violation 122 to customer backend 104 and supplier backend 108. In an embodiment, if degree of violation 122 violates the tolerance level for work order 116, tolerance violation status 124 is sent by collaboration system 110 to customer backend 104 and supplier backend 108.

A content request is typically generated by collaboration system 110 and sent to customer backend 104 and supplier backend 108. The content request is usually sent to customer backend 104 and supplier backend 108 as extensible markup language (XML) messages. It will be appreciated that a variety of messages and other message formats may be used to implement the teachings of the invention as described herein. Furthermore, it is common in the art to speak of a message as being sent or received, in one form or another such as short message service (SMS) message and hypertext markup language (HTML) message. On receipt of the content request from collaboration system 110, customer 102 may generate content 132 in customer backend 104 and send 136 to collaboration system 110. On receipt of the content request from collaboration system 110, supplier 106 may generate content 134 in supplier backend 108 and send 138 to collaboration system 110. Content 132 and content 134 typically include suggestions to resolve tolerance violation status 124. Typically, the suggestions from customer 102 and supplier 106 include a change in work order 116 and a change in progress information 120. In an embodiment, a content update is generated in collaboration system 100, and customer backend 104 and supplier backend 108 may respond to the content update. In an embodiment, content 132, 134 may be updated based on a user requirement. In an embodiment, collaboration system 110 publishes tolerance violation status 124, which is visible to customer 102 through customer backend 104 and to supplier 106 through supplier backend 108. Customer 102 may generate content 132 in customer backend 104 and send 136 to collaboration system 110. Supplier 106 may generate content 134 in supplier backend 108 and send 138 to collaboration system 110. In an embodiment, customer 102 may provide content 132 to collaboration system 110 through a web user interface. Supplier 106 may provide content 134 to collaboration system 110 through a web server interface. Collaboration system 110 resolves 140 tolerance violation status 124 based upon content 132, 134 and work order 116 is updated 142 with the changes suggested by customer 102 and supplier 106.

Once work order 116 is updated, the production process is completed. Supplier 106 ships the products and provides 144 shipping notification 146 from supplier backend 108 to collaboration system 110. Generally, shipping notification 146 is actual shipping information provided by supplier 106 including a shipping time, a shipping date, a shipping location and a shipping quantity. Once customer 102 receives the products, customer 102 provides 150 delivery information 148 from customer backend 104 to collaboration system 110. Generally, delivery information 150 is actual delivery information provided by customer 102 including a delivery time, a delivery date, a delivery location and a delivery quantity. Based upon delivery information 148, collaboration system 110 updates 152 shipping notification 146. On the completion of the production run based on an updated work order, the products are shipped by supplier 106 on the shipping date, and are delivered to customer 102 on the delivery date.

Figure 2:
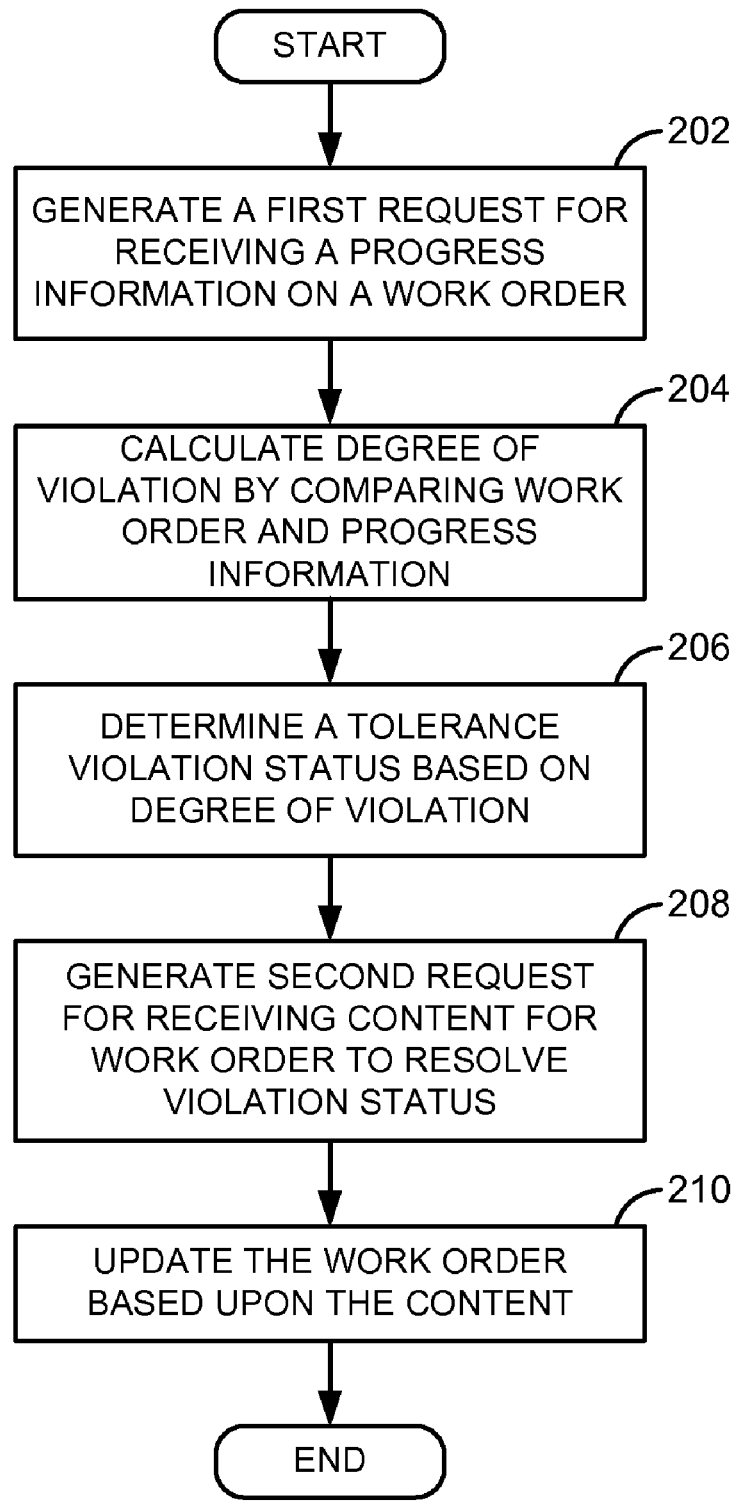
FIG. 2 is a flow diagram of a process for executing a work order according to an embodiment of the invention.

FIG. 2 is a flow diagram of a process for executing a work order according to an embodiment of the invention. In process block 202, a first request is generated to receive a progress information on a work order. The work order is typically a document including supply chain related information provided by a customer and a supplier. The work order covers functional needs of outsourced manufacturing requirements. The first request is generated typically by a collaboration system for the supplier to provide the progress information. Typically, the progress information includes an actual input data, an actual output data, an actual consumption of components and an available date of delivery of products by the supplier. Thus the progress information is an actual data for the work order represented by actual phase input and actual phase output, typically indicating a flow of materials through out a production process. In an embodiment, the collaboration system awaits for the work order from the customer. The collaboration system publishes the received work order, which is visible to the supplier. The supplier may provide the progress information on viewing the work order through a web user interface or automatically through the supplier backend. In an embodiment, the collaboration system publishes the work order. The supplier and the customer may receive a message to inform the publication of the work order.

A degree of violation is calculated by comparing the work order with the progress information in process block 204. Typically, the degree of violation is calculated to determine a deviation of the progress information from the work order. In process block 206, a tolerance violation status is determined based on the degree of violation. Typically, a tolerance violation occurs if the progress information does not conform to a tolerance level of the work order. A tolerance violation status may take one of the values including an actual quantity too high, an actual quantity too low, an actual completion too late, a projected quantity too high, a projected quantity too low, a projected completion too late and a projected completion too early.

In process block 208, a second request is generated to receive a content for the work order typically from the supplier and the customer to resolve the tolerance violation status. Typically, the second request is generally generated by the collaboration system to request the customer and the supplier for providing the content to resolve the tolerance violation status. The content generally includes suggestions to resolve the tolerance violation status. Typically, the suggestions from the customer and the supplier include a change of information in the work order, a change of information in the progress information, and the like. In process block 210, the work order is updated based on the content. In an embodiment, the collaboration system determines the tolerance violation status, which is visible to the customer and the supplier through the web user interface. In an embodiment, the collaboration system publishes the tolerance violation status, which is visible to the customer through the customer backend and to the supplier through the supplier backend. The customer may generate the content in the customer backend and send the content to the collaboration system. The supplier may generate the content in the supplier backend and send the content to the collaboration system. In an embodiment, the customer may provide the content to the collaboration system through a web user interface. The supplier may provide the content to the collaboration system through a web server interface.

Figure 3:
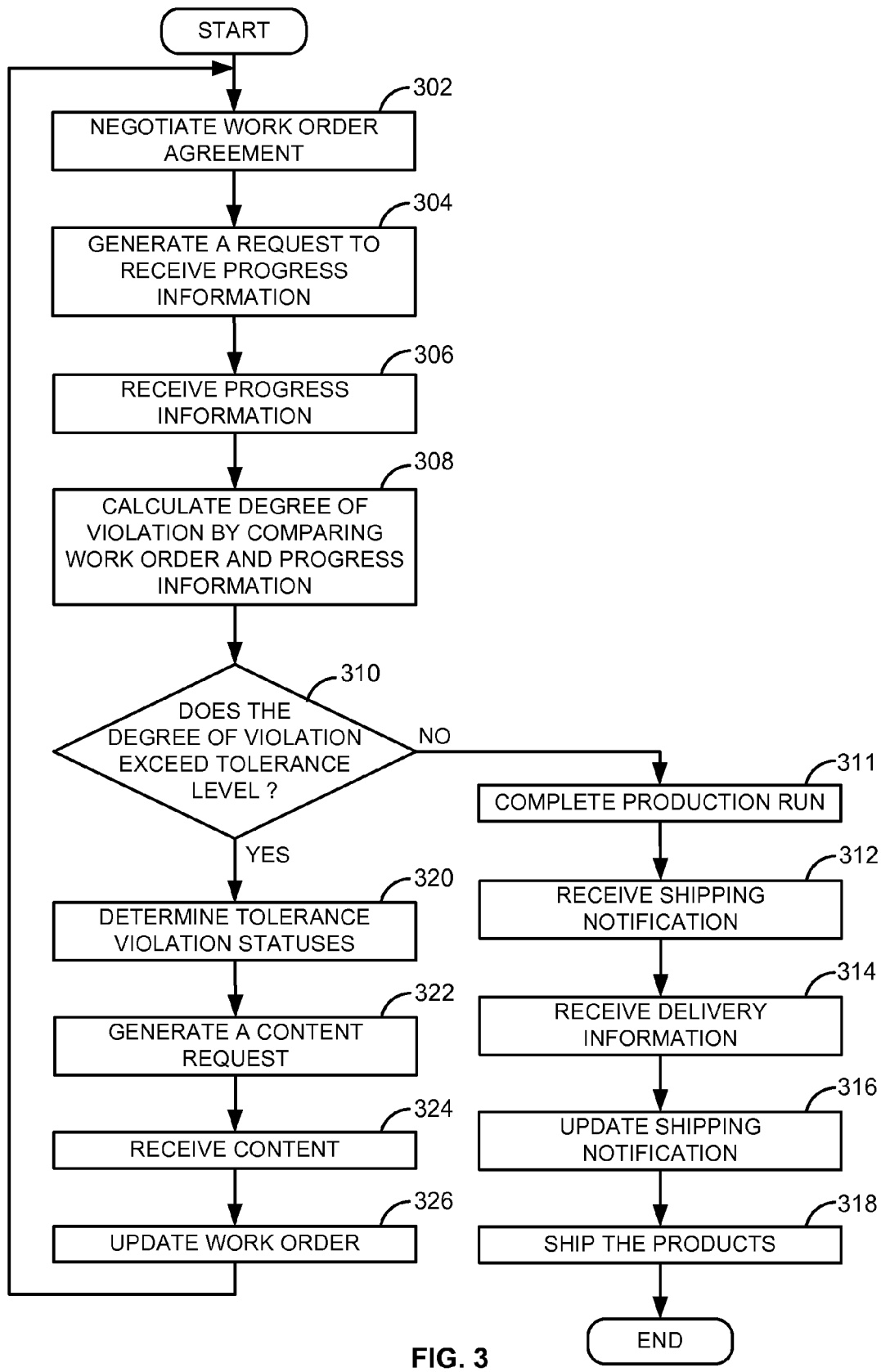
FIG. 3 is a flow diagram of a process for executing a work order according to an embodiment of the invention.

FIG. 3 is a flow diagram of a process for executing a work order according to an embodiment of the invention. In process block 302, a work order is negotiated typically between a customer and a supplier. The work order is typically a document including supply chain related information provided by the customer and the supplier. The work order covers functional needs of outsourced manufacturing requirements. The work order is typically negotiated between the customer and the supplier in a collaboration system. At the end of the negotiation, the customer and the supplier reach an agreement and an agreed work order is generated. The collaboration system generally helps collaboration between the customer and the supplier. In process block 304, a request is generated for the supplier to provide a progress information of the work order. Typically, the progress information includes an actual input data, an actual output data, an actual consumption of the components and an available date of delivery of products by the supplier. Thus, the progress information includes the actual data of the work order represented by the actual phase input and the actual phase output, typically indicating a flow of materials through out a production process. In process block 306, the progress information is received typically from the supplier. In process block 308, a degree of violation is calculated by comparing the progress information with the work order. In an embodiment, a tolerance level for the work order is defined in the collaboration system. The tolerance level is usually a degree of maximum allowed violation. Typically, a tolerance violation occurs if the progress information does not conform to the tolerance level of the work order. Typically, the degree of violation is calculated to determine a deviation of the progress information from the work order. In decision block 310, if the degree of violation exceeds the tolerance level, the process proceeds to process block 320.

A tolerance violation status is determined from the degree of violation in process block 320. Based upon a degree of violation, the tolerance violation status may take one of the values including an actual quantity too high, an actual quantity too low, an actual completion too late, a projected quantity too high, a projected quantity too low, a projected completion too late and a projected completion too early. In process block 322, a content request is typically generated typically by the collaboration system for receiving a content from one or both of the customer and the supplier. In process block 324, the content is received to resolve the tolerance violation status. The content generally includes suggestions to resolve the tolerance violation status. Typically, the suggestions from the customer and the supplier include a change in the work order and a change in the progress information to ensure that a changed work order and the changed progress information do not deviate from the defined violation level. In process block 326, the work order is updated with the content. The process moves from process block 326 to process block 302, where the work order is again negotiated.

In decision block 310, if the degree of violation does not exceed the tolerance level, the process proceeds to process block 311, where the production run is completed based upon an updated work order. The products are shipped typically by the supplier. In process block 312, a shipping notification for the work order is received by the collaboration system, typically from the supplier. Generally, the shipping notification is actual shipping information provided by the supplier including a shipping time, a shipping date, a shipping location and a shipping quantity. In process block 314, a delivery information for the work order is received by the collaboration system, typically from the customer. Generally, the delivery information is actual delivery information provided by the customer including a delivery time, a delivery date, a delivery location and a delivery quantity.

In process block 316, the shipping notification is updated with the delivery information. In an embodiment, the delivery information is a goods receipt. Based upon the delivery information, the collaboration system updates the shipping notification. The products are shipped from the supplier on the shipping date, and are delivered to the customer on the delivery date in process block 318. The products are typically shipped based on the completion of a production run based on an updated work order.

Figure 4:
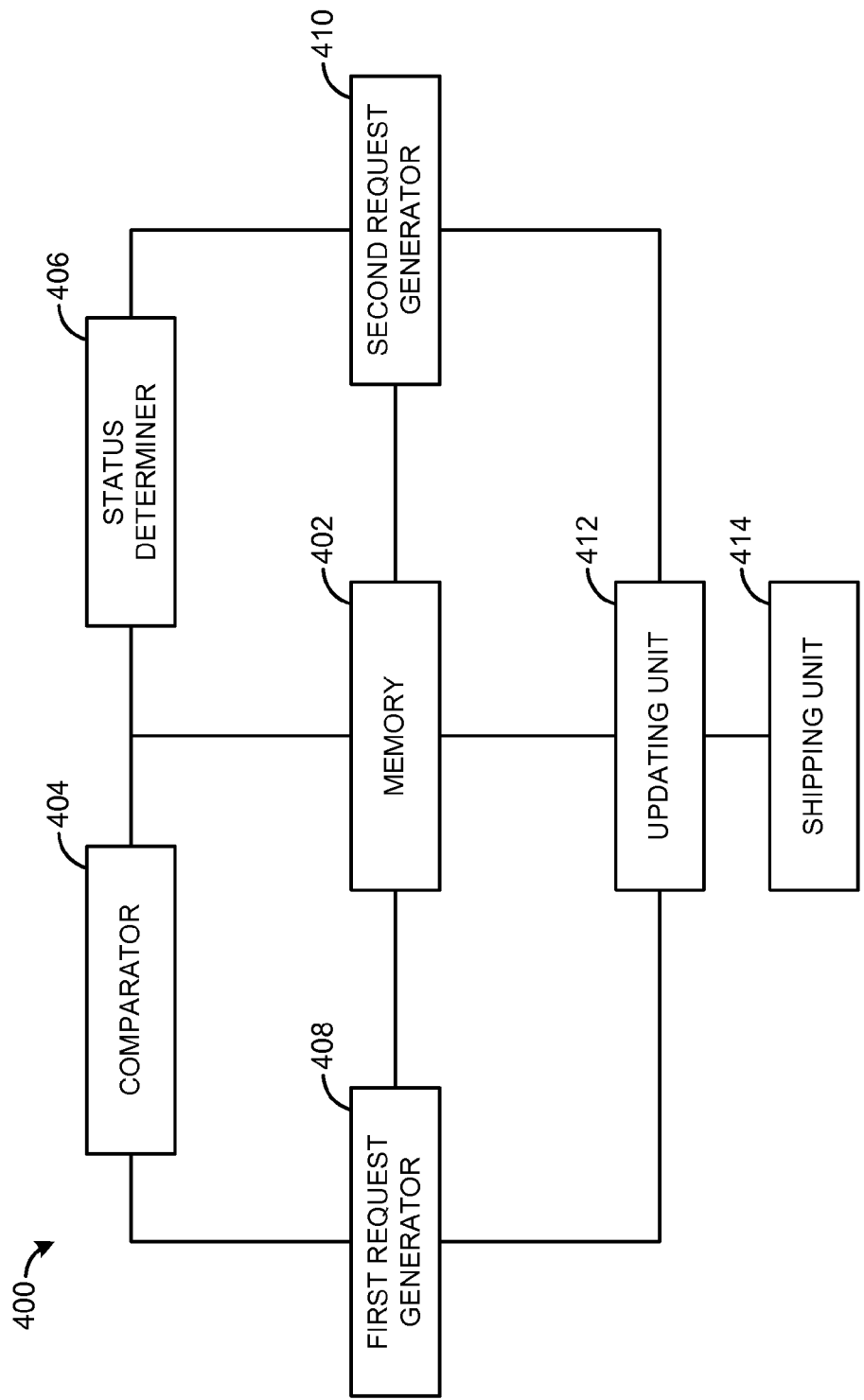
FIG. 4 is a block diagram of a system for executing a work order according to an embodiment of the invention.

FIG. 4 is a block diagram of system 400 for executing a work order according to an embodiment of the invention. System 400 includes memory 402, comparator 404, status determiner 406, first request generator 408, second request generator 410, updating unit 412 and shipping unit 414. According to one embodiment, memory 402 is typically connected to comparator 404, status determiner 406, first request generator 408, second request generator 410, and updating unit 412. First request generator 408 is typically connected to comparator 404 and updating unit 412. Comparator 404 is further connected to status determiner 406. In addition, second request generator 410 is connected to status determiner 406 and updating unit 412. Shipping unit 414 is connected to updating unit 412.

First request generator 408 typically generates a request for receiving a progress information on a work order. The work order is typically a document including a supply chain related information provided by a customer and a supplier. The work order covers functional needs of outsourced manufacturing requirements. Typically, the progress information includes an actual input data and an actual output data, an actual consumption of the components, an available date of delivery of products by the supplier and the like. Thus, the progress information is an actual data of the work order represented by the actual phase input and the actual phase output, typically indicating a flow of materials through out a production process. First request generator 408 typically receives the progress information from a supplier backend. The work order is generally determined from a purchase order generated by a customer backend.

Comparator 404 typically calculates a degree of violation between the work order and the progress information by comparing the work order with the progress information. The degree of violation is calculated to determine a deviation of the progress information from the work order. Typically, a tolerance violation occurs if the progress information does not conform to a tolerance level of the work order. The tolerance level is usually a maximum allowed degree of violation.

Status determiner 406 typically determines a tolerance violation status based upon the degree of violation. In an embodiment, the tolerance violation status is determined only if the degree of violation is above the tolerance level. Based upon the degree of violation, the tolerance violation status may take one of the values including an actual quantity too high, an actual quantity too low, an actual completion too late, a projected quantity too high, a projected quantity too low, a projected quantity too late and a projected quantity too early. The tolerance violation status is typically communicated to the customer backend and supplier the backend. In an embodiment, the status determiner 406 determines the tolerance violation status, which is visible to the customer and the supplier through a web user interface.

Second request generator 410 typically generates a second request to receive a content for the work order to resolve the tolerance violation status. The request to receive a content is generally sent to the customer backend and the supplier backend. The content typically includes suggestions to resolve the tolerance violation status. The customer backend and the supplier backend on receipt of the second request typically generate and send the content to second request generator 410. In an embodiment, the content may be updated by the customer backed and the supplier backend based on a user requirement.

Updating unit 412 typically updates the work order based upon the content received by the customer backend and the supplier backend. Memory 402 typically stores the progress information, the work order, the degree of violation, the tolerance violation status, the content provided by customer and supplier, a shipping notification and a delivery information.

Shipping unit 414 typically receives a shipping notification from the supper backend. Shipping unit 414 also receives a delivery information from the customer backend. Based on the delivery information, the shipping notification is updated by shipping unit 414. Generally, the shipping notification includes a shipping time, a shipping date, a shipping location, a shipping quantity, and the like. Generally, the delivery information includes a delivery time, a delivery date, a delivery location and a delivery quantity. In addition to updating the work order based upon the content, updating unit 412 also updates the shipping notification based upon the delivery information. On completion of a production run based on the updated work order, products are shipped from the shipping location on the shipping date, and are delivered to the delivery location on the delivery date.

The particular methods associated with embodiments of the invention are described in terms of computer software and hardware with reference to flowcharts. The methods to be performed by a computing device (e.g., an application server) may constitute state machines or computer programs made up of computer-executable instructions. The computer-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the invention are not described with reference to any particular programming language. It will be appreciated that a variety of programming languages may be used to implement the teachings of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

Elements of the invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, or other type of machine-readable media suitable for storing electronic instructions. The invention may be downloaded as a computer program which may be transferred from a remote computer (e.g., a server) to a requesting computer (e.g., a client) by way of a communication link (e.g., a modem or network connection).

What is claimed is:

1. A computer implemented method comprising:
    based upon a work order, generating a first request for receiving a progress information to indicate a production run of the work order, wherein the work order includes a projected data and the progress information includes an actual data of the work order;
    invoking a collaboration system for calculating a degree of violation between the work order and the progress information by comparing the work order with the progress information, wherein the degree of violation is a deviation of the actual data present in the progress information from the projected data present in the work order;
    based upon the degree of violation between the work order and the progress information, and a nature of violation, invoking the collaboration system for determining a tolerance violation status, wherein the tolerance violation status describes a value to represent the degree of violation and the nature of violation;
    based upon the value associated with the tolerance violation status, invoking the collaboration system for generating a second request for receiving a content to resolve the tolerance violation status, the content including a modification to the actual data present in the work order and a modification to the projected data present in the progress information; and
    invoking the collaboration system for updating the work order based upon the content, to execute the work order.

2. The computer implemented method of claim 1, wherein the value associated with the tolerance violation status is selected from a group consisting of an actual quantity too high, an actual quantity too low, an actual completion too late, a projected quantity too high, a projected quantity too low, a projected completion too late and a projected completion too early.

3. The computer implemented method of claim 1 further comprising:
    based upon a completion of the production run, receiving a shipping notification from a first entity, the completion of the production run being identified based upon updating the work order;
    based upon the shipping notification, receiving a delivery information from a second entity to execute the work order; and
    updating the shipping notification based upon the delivery information and executing the work order.

4. The computer implemented method of claim 3, wherein the first entity comprises a supplier.

5. The computer implemented method of claim 3, wherein the second entity comprises a customer.

6. The computer implemented method of claim 3, wherein the delivery information comprises a goods receipt.

7. The computer implemented method of claim 1 further comprising updating the content based upon a user requirement, wherein the content is provided from a group consisting of a user input from a user interface and a computer generated message based upon the work order.

8. The computer implemented method of claim 7, wherein the content comprises a suggestion to resolve the tolerance violation status.

9. The computer implemented method of claim 8, wherein the suggestion comprises a change in the work order.

10. The computer implemented method of claim 8, wherein the suggestion comprises a change in the progress information.

11. The computer implemented method of claim 1, further comprising generating the work order based on a purchase order.

12. The computer implemented method of claim 1, further comprises determining the tolerance violation status if the progress information does not conform to a tolerance level of the work order.

13. A computer system comprising:
    a processor operable for reading and executing instructions stored in one or more memory elements; and
    the one or more memory elements storing instructions comprising:
        a first request generator to generate a first request based upon a work order, for receiving a progress information indicating a production run of the work order wherein the work order includes a projected data and the progress information includes an actual data of the work order;
        a comparator electronically coupled to the first request generator, configured to invoke a collaboration system for calculating a degree of violation between the work order and the progress information by comparing the work order with the progress information the degree of violation being a deviation of the actual data present in the progress information from the projected data present in the work order;
        a status determiner electronically coupled to the comparator configured to invoke the collaboration system for determining a tolerance violation status based upon the degree of violation between the work order and the progress information, and a nature of violation, wherein the tolerance violation status describes a value to represent the degree of violation and the nature of violation;

a second request generator electronically coupled to the status determiner, configured to invoke the collaboration system for generating a second request to receive a content to resolve the tolerance violation status based upon the value associated with the tolerance violation status, the content including a modification to the actual data present in the work order and a modification to the projected data present in the progress information; and an updating unit electronically coupled to the first request generator and the second request generator configured to invoke the collaboration system for updating the work order based upon the content, to execute the work order.

14. The computer system of claim 13 further comprising:
a shipping unit electronically coupled to the updating unit for receiving a shipping notification from a first entity and receiving a delivery information from a second entity.

15. A machine-readable non-transitory medium that provides instructions that, when executed by a machine, cause the machine to perform operations comprising:

based upon a work order, generating a first request for receiving a progress information to indicate a production run of the work order, wherein the work order includes a projected data and the progress information includes an actual data of the work order;

invoking a collaboration system for calculating a degree of violation between the work order and the progress information by comparing the work order with the progress information, wherein the degree of violation is a deviation of the actual data present in the progress information from the projected data present in the work order;

based upon the degree of violation between the work order and the progress information, and a nature of violation, invoking the collaboration system for determining a tolerance violation status, wherein the tolerance violation status describes a value to represent the degree of violation and the nature of violation;

based upon the value associated with the tolerance violation status, invoking the collaboration system for generating a second request for receiving a content to resolve the tolerance violation status, the content of including a modification to the actual data present in the work order and a modification to the projected data present in the progress information; and invoking the collaboration system for updating the work order based upon the content, to execute the work order.

16. The machine-readable medium of claim 15 further comprising:
based upon a completion of the production run, receiving a shipping notification from a first entity, the completion of the production run being identified based upon updating the work order;

based upon the shipping notification, receiving a delivery information from a second entity to execute the work order; and updating the shipping notification based upon the delivery information and executing the work order.

17. The machine-readable medium of claim 15, wherein the content comprises a suggestion to resolve the tolerance violation status.

18. The machine-readable medium of claim 17, wherein the suggestion comprises a change in the work order and a change in the progress information.

19. The machine-readable medium of claim 15, further comprising determining the tolerance violation status if the progress information does not conform to a tolerance level of the work order.

* * * * *